March 13, 1945.  S. C. WATSON  2,371,371
VARIABLE SPEED TRANSMISSION
Filed Nov. 9, 1942  2 Sheets-Sheet 2
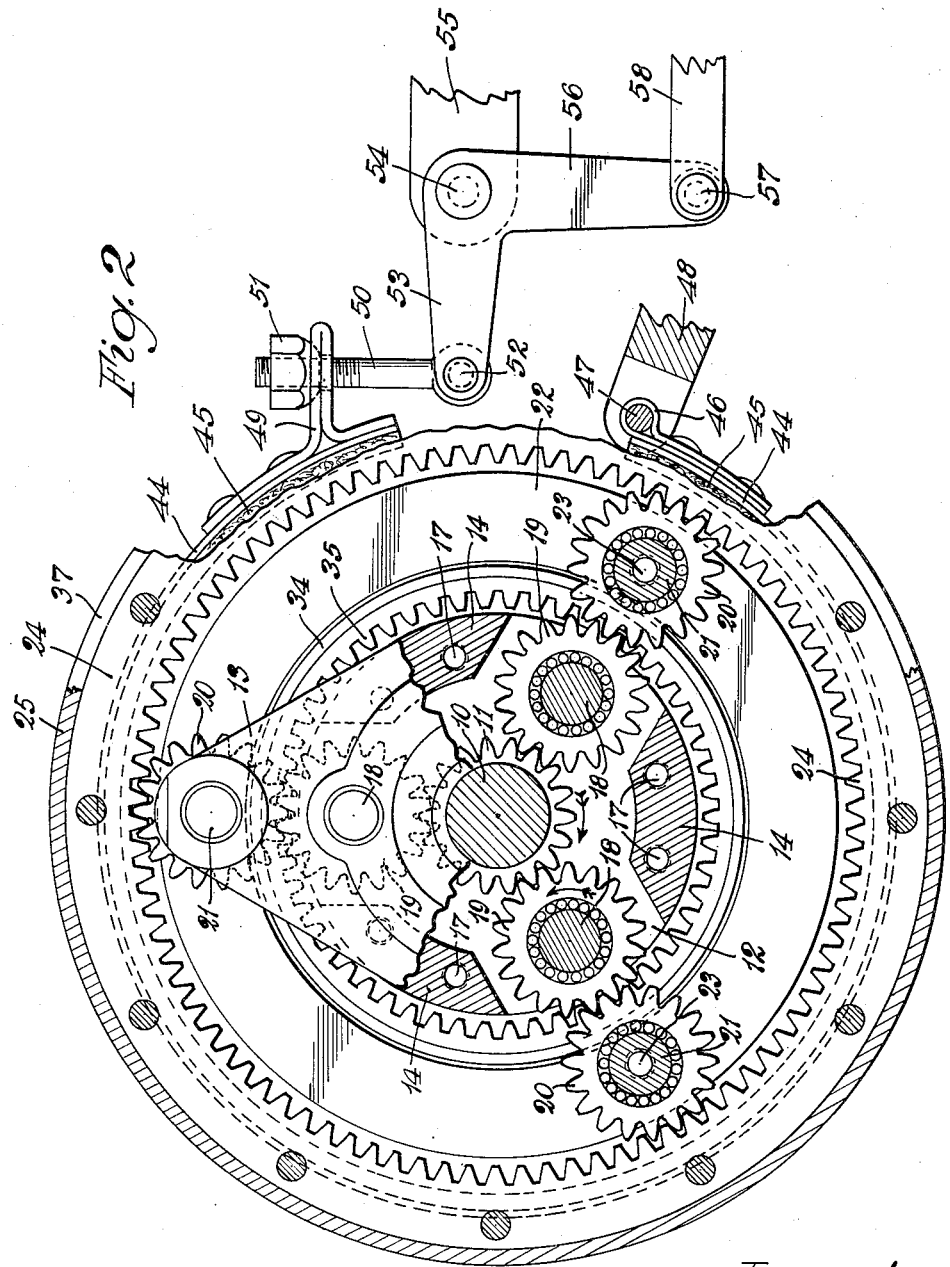
Inventor
Sydney C. Watson
by Parker & Carter
Attorneys Patented Mar. 13, 1945

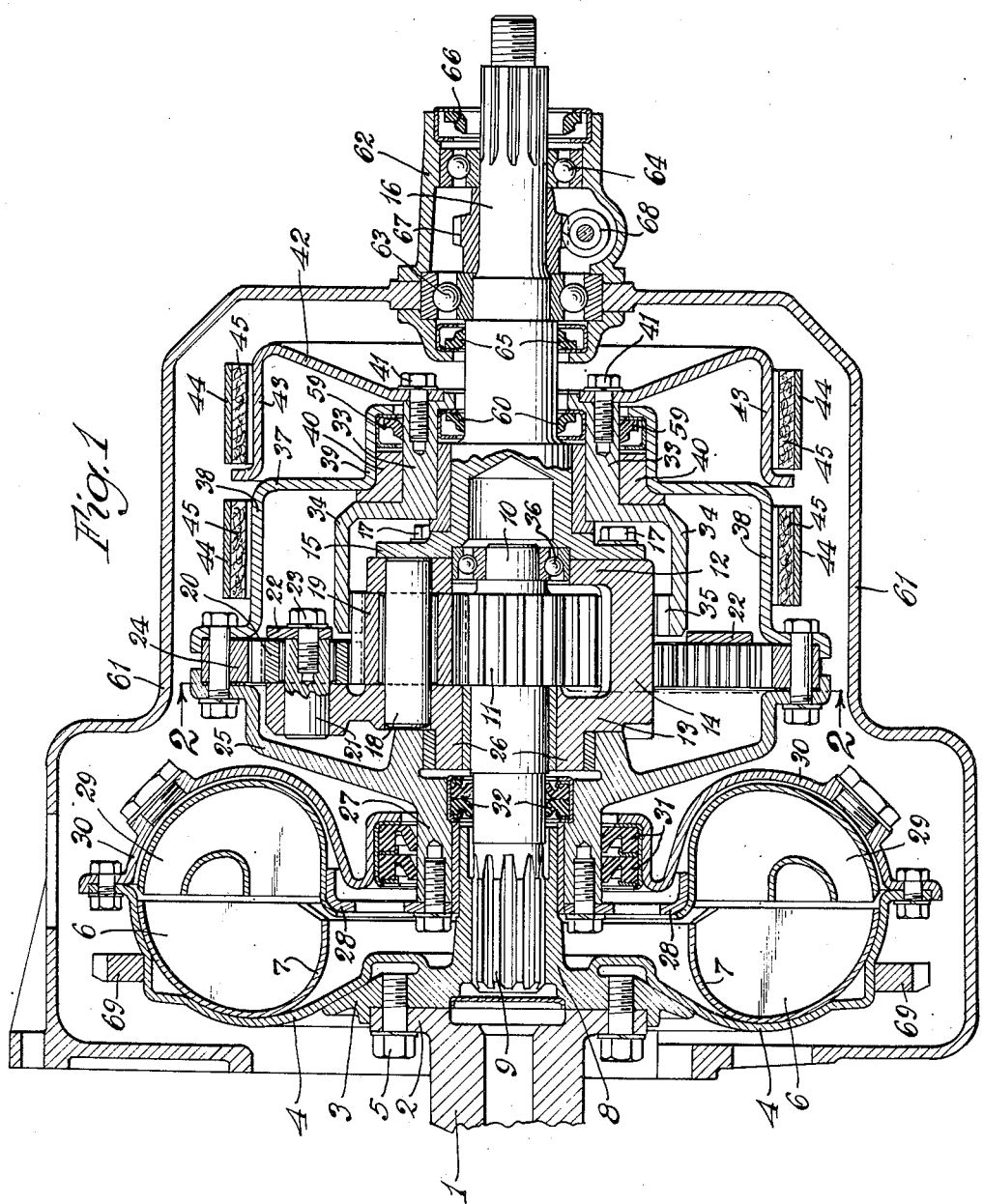

2,371,371

UNITED STATES PATENT OFFICE 2,371,371

VARIABLE-SPEED TRANSMISSION

Sydney C. Watson, Chicago, Ill., assignor to Tor-Vel Associates, having as trustees Sydney C. Watson and Alvin J. Parcelle Application November 9, 1942, Serial No. 464,980

16 Claims. (Cl. 74—189.5)

This invention relates to a variable speed transmission and comprises a device for transmitting rotary motion power or mechanical energy from one shaft to another. In the particular form here shown the axes of the two shafts coincide or are approximately in line. It may be used for many purposes, among which is that of driving machines, machine tools, vehicles, ships, and other articles and mechanisms.

Another object of the invention is to provide a transmission system through which power is transmitted under conditions where a varying torque may be required. An illustration of this condition is that of the high starting torque required by motor vehicles or for the operation of such vehicles in mountainous country, particularly with heavy loads where the torque requirements vary.

Another object is to provide a variable speed transmission which will automatically vary the torque delivered in response to variations in torque demand or load.

Another object is to provide, in connection with a device of the type indicated, means for producing a positive mechanical drive under certain controllable conditions.

A still further object is to provide means for producing a positive reverse drive.

Other objects will appear from time to time throughout the specification and claims.

The invention is illustrated more or less diagrammatically in the accompanying drawings, wherein:

Figure 1 is a longitudinal section with parts in elevation, showing one form of the transmission of this invention.

Figure 2 is a transverse section taken on a somewhat enlarged scale at line 2—2 of Figure 1.

Like parts are indicated by like characters throughout the specification and drawings.

In the particular form here shown, the device includes a fluid coupling of a well-known type although other types of fluid couplings may be used.

1 is a driving shaft provided with a flange 2, to which the base 3 of an impeller housing 4 is secured by screws 5 or otherwise. Vanes 6 are positioned within an annular shell 7, which is carried by the housing 4. The hub 8 of the impeller housing is splined to receive the splined end 9 of a shaft 10. Fixed upon this shaft is a pinion gear 11. Surrounding this pinion is a carrier which comprises a relatively disk-like member 12 and a relatively triangular member 13, which are joined by a plurality of sections 14. This carrier is free to turn in relation to the shaft 10, which is itself fixed in relation to the driving shaft 1, and it is free also to turn with respect to the pinion 11, but is rigidly connected to a flange 15 of the driven shaft 16 by screws 17 or otherwise. Mounted upon axles or spindles 18, which are carried by the carrier, is a plurality of idler pinions 19 which are in mesh and may be driven by the pinion 11 on the shaft 10.

A second series of idler pinions 20 is carried upon spindles or axles 21, mounted adjacent the triangular portions of the carrier member 13. Fastened to the axles 21 is a ring 22, which is held in place by screws 23. As shown particularly in Figure 1, this ring is in contact with the free ends of the idlers 20, and prevents them from being displaced from the axles or spindles 21. The pinions 20, since they mesh with the pinions 19, may be driven by them.

Surrounding and in mesh with the second series of pinions, that is to say with the pinions 20, is an internal gear 24, which may either drive the pinions 20 or be driven by them. The internal gear 24 is rigidly attached to a member 25, whose axis coincides with that of the driving shaft, and which also rotatably supports one end 26 of the carrier, which includes the members 12, 13 and 14, and the member 25 is provided with a hub 27, which is supported upon the hub 8 of the impeller housing 4. Suitable bearing or surface members are provided between these parts to permit their free rotation. The member 25 through the hub 27 and the ring 28 is secured to the runner 29 of the fluid coupling and may be driven by it. The runner is enclosed in a housing 30, which is secured to the housing portion 4. Suitable packing or leak-preventing means 31 may be provided between the housing member 30 and the exterior surface of the hub 27, and the parts as shown in Figure 1 are shaped to receive and position such packing. Suitable packing 32 is also provided between the inner face of the hub 27 and the opposite portion of the shaft 10.

Supported by and rotatably mounted about the driven shaft 16 is a sleeve or hub 33, which carries an enlargement 34 upon the inner face of which is formed or carried a second internal gear 35, which surrounds and is in mesh with the first series of idler gears 19. Located partly within the carrier portion 12 and partly within the flange 15 of the driven shaft 16 is an anti-friction bearing 36, which is shown as a ball bearing, but which might be roller or any other type of anti-friction bearing. It supports one end of the shaft 10 and holds it in alignment with respect to the carrier and the driven shaft 16. This bearing may be a plain radial bearing or a combined radial and thrust bearing to absorb any end thrust which may be set up by the fluid coupling, the gears, or otherwise.

Attached by bolts or otherwise to the internal gear 24 is a shell 37, which has on its exterior a braking surface 38 and which is also formed to provide a bearing surface 39, which surrounds the hub 33 and may be in contact with a bearing member 40 positioned between the hub 33 and the shell portion 39.

Rigidly attached by screws 41 or otherwise to the hub 33 is a second member 42, which carries a brake drum 43. Each of the braking surfaces 38 and 43, respectively, may be acted upon by any suitable braking means, such as an external contracting or an internal expanding band or shoe. As shown, each is provided with an external contracting brake member 44, 44 at the inner surface of which brake lining 45 of any suitable nature is provided. A suitable operating means is indicated in Figure 2, and as shown this includes an ear 46, fixed by a pin 47 to an abutment 48. It includes a second ear 49, which is perforated to receive loosely an operating member 50, which has a rounded head 51 at one end and at its opposite end is connected as at 52 to an arm 53 of a bell crank, which is pivoted as at 54 upon an abutment 55. The opposite arm 56 of the bell crank is connected at 57 to a link 58, by means of which it may be operated. It is to be understood that any sort of brake operating means may be used without departing from the spirit of this invention, and the operating means may be by foot or by hand or by electricity or otherwise and may use any desired linkage. The operating means diagrammatically shown herewith are therefore merely illustrative of the fact that operating means are provided for the brakes.

Packing means 59 and 60 are provided, respectively, between the shell 37 and the exterior of the hub 33 and between the interior of the hub 33 and the exterior of the driven shaft 16.

A shell or housing 61 may be provided to enclose the entire mechanism, and if used it may provide a support for a portion of the driven shaft 16. As shown herewith, the housing or shell 61 carries an extension 62 within which anti-friction bearings 63 and 64 are positioned, and these bearings support the shaft 16. Packing means 65 are provided within the shell 61, and additional packing means 66 may be provided outside of it. If desired, a speedometer drive, including the members 67 and 68 may be included, although obviously the invention is not limited to their use. Similarly, if desired, the shell 4 may carry a starter ring gear 69.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The use and operation of this invention are as follows:

In the particular form here shown this device is suitable for use under conditions of changing torque requirements at varying speeds. One obvious use is, therefore, in the drive of an automotive vehicle. Under some conditions it is necessary to provide for an automotive vehicle a rigid and unyielding connection between the driving and the driven shafts at a definite, predetermined speed ratio and with a corresponding increase in torque delivered.

Under other conditions it is desirable to stop the rotation of the driven shaft without stopping the rotation of the driving shaft and, therefore, without stopping the rotation of the engine, and to do this without the use of a clutch or any other desired connecting device. These conditions are satisfied by the mechanism shown. It is also desirable to provide means for changing the direction of rotation of the driven shaft, as for example when it is necessary to reverse the direction of movement of a vehicle. And it is desirable to do this without reversing the direction of the driving shaft and without the use of additional reverse gears or mechanisms. The device of the present invention accomplishes these purposes.

At times in a drive, whether it be for a vehicle or for other purposes, it is desirable to obtain an infinitely variable speed reduction between the driving and the driven shaft from no rotation of the driven shaft to rotation of the driven shaft equal to the speed of the driving shaft. This is accomplished by the structure of the present invention.

If it be assumed now that the device of this invention is mounted upon an automotive vehicle and is to be used for the transmission of power from the prime mover to the road wheels of the vehicle, the parts are generally in the position shown and the operation is as follows:

The engine will be started, and if it is an internal combustion engine and is, therefore, not self-starting, it is desirable to be able to allow the engine to run while the vehicle remains stationary. This is done by permitting the engine to run at idling speed. When that occurs the pinion 11 on the shaft 10 drives the first series of idler gears, that is the members 19, which are mounted in the carrier formed generally of the parts 12, 13 and 14. These pinions in turn rotate the gears 20 of the second series of idler gears. This second series of gears is also mounted in or supported by the carrier formed of the members 12, 13 and 14, and they also mesh with the internal gear 24, and this gear is connected to the runner of the fluid coupling.

During the period while the engine idles and the vehicle is stationary, the idler pinion carrier formed of the members 12, 13 and 14 will initially be stationary. Since that carrier is connected to the driven shaft 16, and since at low speeds the fluid coupling has only slight driving effect, there is little or no driving impulse through the coupling to rotate the internal gear 24. That being the case, there is established a definite ratio of rotative speed between the gear 11, which is fixed with relation to the driving shaft 1, and the internal gear 24, which is attached to the runner. Since two sets of meshing idler gears are provided between the external gear 11 and the internal gear 24, that gear rotates in the same direction as does the gear 11, and a definite ratio of rotative speed is established between the two gears 11 and 24. With the mechanism of this invention a complete or 100 per cent slip between the driving member or impeller and the driven member or runner of the fluid coupling is not required during the period when the engine, source of power, or shaft 1 is rotating idly and without transmitting rotative movement to the driven shaft 16.

Due to the train of gears which is inserted between the driving pinion 11 and the internal gear 24, when there is no rotary motion being transmitted from the driving shaft 1 to the driven shaft 16, the runner of the fluid coupling can rotate in the same direction as the impeller at reduced speed even though the driven shaft 16 is stationary.

By permitting the runner or driven member of the fluid coupling to rotate while the engine is idling and while the final driven shaft 16 is stationary, the tendency of the driven shaft or load to creep forward is eliminated. This is due to the elimination of the drag on the runner of the fluid coupling imparted to it by the impeller or driving member of the fluid coupling.

This feature of the invention permits the already running engine or driving shaft to be rotatively disconnected from the driven shaft or load without the intervention of a clutch or other mechanical dis-engaging device. This feature also provides an infinitely variable rotative speed ratio between the driving member, engine or source of power and the driven member or load, varying in degree from a condition equivalent to a disconnection between the two members to a condition of unity or direct drive where the driving and driven members rotate at approximately the same rotative speed and in the same direction.

It should also be noted that this invention also provides an infinitely variable speed ratio between the runner or driven member of the fluid coupling and the driven shaft 16.

During the period in which the engine is idling, sufficient torque or turning effort is not imparted to the runner or driven member of the fluid coupling to decrease or change the relative rotative speed ratio established between the driving pinion 11 and the internal gear 24 by the train of idler pinions 19 and 20.

When the rotative speed of the engine, and thereby the impeller or driving member of the fluid coupling, is increased to a point whereby sufficient torque is imparted to the runner or driven member of the fluid coupling to increase the rotative speed of the runner in relation to the speed of the impeller or to change the rotative speed ratio between said runner and impeller established by the gear train, then the driven shaft 16 will be caused to rotate in the same direction as the driving shaft 1 at a speed varying from a state of rest to a speed approximately equal to that of the driving shaft 1.

This device, therefore, provides or comprises the following:

A means of disconnecting the driving shaft from the driven shaft without a clutch or other dis-engaging device.

A flexible, automatic, and infinitely variable speed ratio between driving shaft and driven shaft.

A positive maximum geared reduction with corresponding torque increase and positive connection between driving shaft and driven shaft.

A positive reverse drive without the use or intervention of a separate gear train or other reversing mechanism.

For some purposes it is desirable to have the driven shaft rigidly or inflexibly connected to and driven by the driving shaft with a large increase in torque. When that is necessary, the brake which contacts the braking surface 43 of the drum 42 is operated and rotation of the second internal gear 35 is thereby prevented. The drive is then directly from the driving shaft 1, through the shaft 10, the gear 11, the idlers 19, and these idlers cause the carrier formed of the members 12, 13 and 14 to rotate in the same direction as the driving shaft, and at a reduced speed, but with a correspondingly increased torque, since the smaller internal gear is now used as a track or abutment member. When the carrier is thus rotated with the gear 35 stationary, it rotates the flange 15, which is attached to the driven shaft 16. During this condition the fluid coupling is completely by-passed, but there is nevertheless applied the torque imparted to it by the kinetic energy of the oil toward the rotation of the idler carrier and hence toward rotation of the driven shaft by virtue of the gears and other parts.

For some purposes the condition just above described is necessary when starting the vehicle or when causing it to climb a steep grade. For many starts it will not be necessary. When it is necessary under normal conditions to start the vehicle from a stationary condition while the engine is running, it is necessary only to accelerate the engine so as to impart torque to the runner or driven member of the fluid coupling.

When the engine is thus accelerated, the relative rotative speed of the driving and the driven member of the fluid coupling changes so that it is not in the same proportion as the number of teeth in the first driving gear 11 in relation to the number of teeth in the large internal gear 24. This change in ratio is due to the fact that the impeller 6 tends to pick up the receiver 29 and thereby to exert an auxiliary driving effort on the gear 24, which, in turn, is applied to the driven carrier 15. Then the idler carrier and the driven shaft 16 connected to it move forward in the same direction and at a variable rate of speed, which may be changed from a state of rest to a state of unity with the driving shaft by virtue of the acceleration of the engine speed and the relation between the turning effort required at the road wheels and the effort available from the engine.

An important advantage of the transmission here shown is its value as a brake while the vehicle upon which it is mounted is descending a steep incline. This is of particular importance when the vehicle is carrying heavy loads. To cause the transmission to act as a brake, it is only necessary to actuate the brake which controls or prevents rotation of the smaller internal gear 35. This inserts a speed-up gear drive between the road wheels of the vehicle and the engine and thus effects a braking action on the vehicle as a whole.

The transmission of this invention provides within itself a means for reversing the direction of drive. To obtain a reversal of direction of the driven shaft, the brake which operates on the braking surface of the member 38, which is attached to the large internal gear 24, is actuated and thus prevents rotation of this internal gear. By reason of the drive from the gear 11 on the shaft 10 to the first series of idler pinions 19 and then to the second series of idler pinions 20, the idler pinion carrier formed of the members 12, 13 and 14 is caused to rotate backward in a direction opposite to that of the driving shaft, thus carrying the driven shaft with it and thus effecting a reverse in the direction of rotation of the driven shaft 16 and of the parts such as wheels which may be driven from it.

The progressive action which takes place when the device of the present invention is applied to an automotive vehicle and when that vehicle is brought from a standing condition into a condition of motion may be summarized as follows:

When the vehicle is stationary and the engine is running at low speed, the impeller, with its vanes 6, is driven, the gear 11 is rotated, and it rotates the idlers 19 about their axes, which in turn rotate the idlers 20 about their axes, and they drive the internal gear 24 in the same direction as the impeller. The gear 24 is secured to the runner 29. This rotation of the internal gear 24 imparts no driving effect to the driven shaft 16. While the action just described is taking place, rotation of the idlers 19 also rotates the smaller internal gear 35, which in turn rotates about the driven shaft 16 and has no tendency to rotate that shaft. Since the runner 29 is connected to the internal gear 24, when that gear is rotated as just described, the runner of the fluid coupling also rotates.

If now the engine is accelerated to a degree of speed at which the torque imparted on the runner 29 is sufficient to overcome, through the medium of this train of gears, the reluctance of the driven shaft 16 to being rotated, the shaft 16, which is in turn attached to the load, will rotate in the same direction as the driving shaft, according to the proportion of the torque available in driving shaft 1 as compared to the torque required at the driving shaft 16.

When the internal gear 24 is rotating at a fraction of the rotative speed of the gear 11, which is in proportion to the number of teeth in the gear 24, divided into the number of teeth in the gear 11, there is of course no rotation or movement of the carrier 12, 13 and 14. But when sufficient torque is imparted by the impeller blades to the runner blades 29 to increase the speed of the gear 24 in relation to the speed of the gear 11, thereby changing the rotative speed ratio between these two members, then the carrier 12, 13 and 14, by virtue of the pinions 19 and 20, will move forward in the same direction as the gear 11 and at a speed which is a resultant of the speed of the gears 24 and 11. The forward rotative speed of this gear carrier 12, 13 and 14 will constantly vary, with variations in torque requirements, from a point where there is no movement of the carrier to a point of unity with the gear 11, when the gear 24 is rotating in the same direction and at the same speed as the gear 11.

I claim:

1. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of radially spaced sets of idler gears mounted for rotation in said carrier and positioned one outside of the other, the innermost set being meshed with said pinion, and the outermost set being meshed with said innermost set, a gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second gear meshing with said innermost set of idlers, and brake means for holding said second gear against rotation.

2. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion about an axis coinciding with that of the pinion, a plurality of radially spaced sets of idler gears mounted for rotation in said carrier and positioned one outside of the other, the innermost set being meshed with said pinion, and the outermost set being meshed with said innermost set, a gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second gear meshing with said innermost set of idlers, and brake means for holding said second gear against rotation.

3. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of radially spaced sets of idler gears mounted for rotation in said carrier and positioned one outside of the other, the innermost set being meshed with said pinion, and the outermost set being meshed with said innermost set, a gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second internal gear meshing with said innermost set of idlers, and brake means for holding said second gear against rotation.

4. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of sets of idler gears mounted for rotation in said carrier one of said sets being at a greater radial distance from the center than the other set, the innermost set being meshed with said pinion, and the outermost set being meshed with said innermost set, an internal gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second gear meshing with said innermost set of idlers, and brake means for holding said second gear against rotation.

5. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of sets of idler gears mounted for rotation in said carrier one of said sets being at a greater radial distance from the center than the other set, the innermost set being meshed with said pinion, and the outermost set being meshed with said innermost set, an internal gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second internal gear meshing with said innermost set of idlers, and brake means for holding said second internal gear against rotation.

6. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of sets of idler gears mounted for rotation in said carrier one of said sets being at a greater radial distance from the center than the other set and radially aligned therewith, the innermost set being meshed with said pinion, and the outermost set being meshed with said innermost set, an internal gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second, smaller internal gear meshing with said innermost set of idlers, and brake means for holding said second internal gear against rotation.

7. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion about an axis coinciding with that of the pinion, a plurality of sets of idler gears mounted for rotation in said carrier and positioned one outside of the other and along the same radial line, the innermost set being meshed with said pinion, and the outermost set being meshed with said innermost set, an internal gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second, smaller internal gear meshing with said innermost set of idlers, and brake means for holding said second internal gear against rotation.

8. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion, a plurality of sets of idler gears mounted for rotation in said carrier one of said sets being at a greater radial distance from the center than the other set and radially aligned therewith, the innermost set being meshed with said pinion, and the outermost set being meshed with said innermost set, a gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second gear meshing with said innermost set of idlers, and brake means for holding said second gear against rotation, said driving shaft, said pinion, said driven shaft and said first and second gears all mounted for coaxial rotation.

9. In combination in a transmission, a driving shaft, a fluid coupling including an impeller and a runner, the impeller being fixed with relation to said driving shaft, a pinion connected to said driving shaft to be positively driven thereby, a carrier positioned for rotation with respect to said pinion about an axis coinciding with that of the pinion, a plurality of sets of idler gears mounted for rotation in said carrier one of said sets being at a greater radial distance from the center than the other set and radially aligned therewith, the innermost set being meshed with said pinion, and the outermost set being meshed with said innermost set, an internal gear positioned about and meshing with said outermost set of idlers, said internal gear being fixed in relation to the runner of said fluid coupling, a driven shaft, said shaft being fixed to said carrier and adapted to be rotated thereby, brake means for holding said internal gear against movement, a second, smaller internal gear meshing with said innermost set of idlers, and brake means for holding said second internal gear against rotation, said driving shaft, said pinion, said driven shaft and said first and second gears all mounted for coaxial rotation.

10. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier outside of and radially aligned with the first set, the idlers of each set meshing with the idlers of the outer set, a gear positioned about said idlers and meshing with one set, said gear being fixed in relation to the runner of the fluid coupling, a second gear meshing with the idlers of the other set, a driven shaft joined to and adapted to be rotated by said carrier, brake means for holding said first gear against movement, and additional brake means for holding said second gear against movement, and means for operating said brake means.

11. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier outwardly beyond said first set and radially aligned with it, the idlers of each set meshing with the idlers of the outer set, a gear positioned about said idlers and meshing with one set, said gear being fixed in relation to the runner of the fluid coupling, a second gear meshing with the idlers of the other set, a driven shaft joined to and adapted to be rotated by said carrier, brake means for holding said first gear against movement, and additional brake means for holding said second gear against movement and means for operating said brake means.

12. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier, the idlers of each set meshing with the idlers of the outer set and being aligned therewith, an internal gear positioned about said idlers and meshing with the one set, said gear being fixed in relation to the runner of the fluid coupling, a second gear meshing with the idlers of the other set, a driven shaft joined to and adapted to be rotated by said carrier, brake means for holding said first internal gear against movement, and additional brake means for holding said second gear against movement, and means for operating said brake means.

13. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier, the idlers of each set meshing with the idlers of the outer set, a gear positioned about said idlers and meshing with one set, said gear being fixed in relation to the runner of the fluid coupling, a second internal gear meshing with the idlers of the other set, a driven shaft joined to and adapted to be rotated by said carrier, brake means for holding said first gear against movement, and additional brake means for holding said second internal gear against movement, and means for operating said brake means.

14. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier, the idlers of each set meshing with the idlers of the outer set, an internal gear positioned about said idlers and meshing with one set, said gear being fixed in relation to the runner of the fluid coupling, a second internal gear meshing with the idlers of the other set, a driven shaft joined to and adapted to be rotated by said carrier, brake means for holding said first internal gear against movement, and additional brake means for holding said second internal gear against movement, and means for operating said brake means.

15. In combination in a transmission a driving shaft, a driving pinion fixed in relation thereto to be driven thereby, a fluid coupling including an impeller and a runner, the impeller fixed in relation to the driving shaft and driven thereby, an idler gear carrier positioned with respect to said pinion and free to rotate thereabout, a set of idler gears mounted in said carrier and meshing with said pinion, a second set of idler gears mounted in said carrier outwardly beyond said first set, the idlers of each set meshing with the idlers of the outer set, an internal gear positioned about said idlers and meshing with one set, said gear being fixed in relation to the runner of the fluid coupling, a second internal gear meshing with the idlers of the other set, a driven shaft joined to and adapted to be rotated by said carrier, brake means for holding said first internal gear against movement, and additional brake means for holding said second internal gear against movement, and means for operating said brake means.

16. In combination in a transmission a driving shaft, a driving pinion coaxial with said shaft and fixed in relation thereto to be driven thereby, a fluid coupling including an impeller and a runner, the impeller fixed in relation to the driving shaft and driven thereby, an idler gear carrier positioned coaxially with respect to said pinion and free to rotate thereabout, a set of idler gears mounted in said carrier and meshing with said pinion, a second set of idler gears mounted in said carrier outwardly beyond said first set, the idlers of each set meshing with the idlers of the outer set, an internal gear positioned about said idlers and meshing with one set, said gear being fixed in relation to the runner of the fluid coupling, a second internal gear meshing with the idlers of the other set, a driven shaft joined to and adapted to be rotated by said carrier, brake means for holding said first internal gear against movement, and additional brake means for holding said second internal gear against movement, and means for operating said brake means.

SYDNEY C. WATSON.